United States Patent
Okazawa et al.

(10) Patent No.: US 10,188,117 B2
(45) Date of Patent: Jan. 29, 2019

(54) NOODLE STRING TREATMENT APPARATUS AND TREATMENT METHOD

(75) Inventors: Kenji Okazawa, Osaka (JP); Koji Sakai, Osaka (JP); Kazuhiro Nakatani, Osaka (JP); Hiroko Imaki, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 1284 days.

(21) Appl. No.: 13/704,966

(22) PCT Filed: Jun. 17, 2011

(86) PCT No.: PCT/JP2011/063963
§ 371 (c)(1),
(2), (4) Date: Mar. 15, 2013

(87) PCT Pub. No.: WO2011/158944
PCT Pub. Date: Dec. 22, 2011

(65) Prior Publication Data
US 2013/0160659 A1    Jun. 27, 2013

(30) Foreign Application Priority Data

Jun. 17, 2010 (JP) .................. 2010-137816

(51) Int. Cl.
*A21C 11/22* (2006.01)
*A21C 11/10* (2006.01)
*A21C 15/04* (2006.01)

(52) U.S. Cl.
CPC .............. *A21C 11/22* (2013.01); *A21C 11/10* (2013.01); *A21C 15/04* (2013.01);
(Continued)

(58) Field of Classification Search
CPC ....... A21C 11/22; A21C 11/10; A21C 11/103; A21C 11/16; A21C 11/24; A21C 15/04
(Continued)

(56) References Cited

U.S. PATENT DOCUMENTS 4,837,382 A * 6/1989 Ruegg ................. A21C 3/10
425/294
5,063,839 A * 11/1991 McFeaters ........... A21C 11/04
425/298
(Continued)

FOREIGN PATENT DOCUMENTS

GB    2 030 848 A † 4/1980
JP    55-045382 A † 3/1980
(Continued)

OTHER PUBLICATIONS

Japanese Notice of Allowance issued in Japanese Application No. 2012-520512 dated Feb. 4, 2014, 1 pg.†
(Continued)

*Primary Examiner* — Ibrahime A Abraham
*Assistant Examiner* — Justin Dodson
(74) *Attorney, Agent, or Firm* — McDermott Will & Emery LLP

(57) ABSTRACT

To provide a noodle string treatment apparatus and treatment method capable of manufacturing instant noodles that are short noodle strings. The noodle string treatment apparatus of the present invention has: a cutting device having a rotary blade and cutting a batch of noodle strings into a predetermined length; and a control device for controlling a blade edge peripheral speed of the rotary blade, wherein the control device changes the blade edge peripheral speed of the rotary blade during rotation thereof.

6 Claims, 6 Drawing Sheets

(52) U.S. Cl.
CPC ........ *Y10T 83/0448* (2015.04); *Y10T 83/4734* (2015.04); *Y10T 83/4737* (2015.04)

(58) Field of Classification Search
USPC ......... 99/485, 491, 501, 503, 509, 516, 534, 99/536; 426/464, 517, 518; 83/37, 38, 83/285, 299, 311
See application file for complete search history.

(56) References Cited

U.S. PATENT DOCUMENTS

| | | | | |
|---|---|---|---|---|
| 5,162,119 | A * | 11/1992 | Pappas | A21C 9/04 |
| | | | | 101/106 |
| 6,187,358 | B1 * | 2/2001 | Inoue | A21C 11/10 |
| | | | | 425/308 |
| 2008/0250945 | A1 * | 10/2008 | Seager | B26D 5/007 |
| | | | | 99/537 |
| 2009/0029019 | A1 * | 1/2009 | Jani | A21C 11/163 |
| | | | | 426/284 |
| 2009/0220674 | A1 * | 9/2009 | Katz | A23J 3/225 |
| | | | | 426/656 |

FOREIGN PATENT DOCUMENTS

| | | | |
|---|---|---|---|
| JP | 01-273535 | A † | 11/1989 |
| JP | 05-227870 | A † | 9/1993 |
| JP | 06-276916 | A † | 10/1994 |
| JP | 10-042775 | A † | 2/1998 |
| JP | 2004-097145 | A † | 4/2004 |

OTHER PUBLICATIONS

International Search Report dated Jul. 26, 2011 issued in corresponding International Application No. PCT/JP2011/063963.†
International Preliminary Report on Patentability dated Jan. 15, 2013 in corresponding International Application No. PCT/JP2011/063963.†

* cited by examiner
† cited by third party

NOODLE STRING TREATMENT APPARATUS AND TREATMENT METHOD

RELATED APPLICATIONS

This application is the U.S. National Phase under 35 U.S.C. § 371 of International Application No. PTC/JP2011/063963, filed on Jun. 17, 2011, which in turn claims the benefit of Japanese Application No. 2010-137816, filed on Jun. 17, 2010, the disclosures of which Applications are incorporated by reference herein.

TECHNICAL FIELD

The present invention relates to a noodle string treatment apparatus and method for producing instant noodles.

BACKGROUND ART

The lengths of most instant noodles are normally approximately 20 to 70 cm. In recent years, noodle strings as short as approximately 1 to 7 cm that can be eaten in soup form are required to be made to respond to diversification of customers' tastes. Especially countries overseas have high demand for noodle products with short noodle strings that can be eaten in soup form. For this reason, there is increased need for manufacturing short noodle strings in the instant noodle industry.

Instant noodles are normally produced in a series of the following steps: formation of dough by mixing flour and water; rolling; slicing into noodle strings; steaming or boiling the noodle strings; stretching; cutting; and drying. Generally a rotary blade is used to cut the noodle strings that are hung down. The noodle strings need to be cut short in the cutting step in order to obtain the short noodle strings described above.

An instant noodle production line is for industrially treating noodle strings for large number of servings and therefore can treat noodle strings at high speeds. In this situation, the number of cuts per unit time needs to be further increased in order to cut noodle strings short while keeping a certain weight of noodles per serving.

There is a method for increasing the rotating speed of the rotary blade in order to increase the number of cuts. On the other hand, noodle strings that are obtained before being cut are already gelatinized and therefore become highly viscous as a result of being braised or boiled. Consequently, increasing the rotating speed of the rotary blade occasionally causes the noodle strings that were unable to fall by their own weight immediately after being cut to be scattered by the cutting blade.

In fields other than instant noodles, there are cutting methods in the field of pasta such as macaroni, etc., as methods for slicing short noodle strings (pasta). The cutting method, however, is basically a product for producing noodle strings by extruding noodles through a die or the like. There is also a cutting device such as the one disclosed in, for example, Patent Literature 1; however, such a cutting device is not suitable for manufacturing instant noodles.

In the field of instant noodle manufacturing, a noodle string treatment apparatus and noodle string treatment method capable of manufacturing instant noodles of approximately 1 to 7 cm in length are not to be developed yet.

CITATION LIST

Patent Literature

Patent Literature 1: Japanese Patent Application Publication No. H5-227870

SUMMARY OF INVENTION

Technical Problem

The inventors of the present invention aim to develop a noodle string treatment apparatus and method capable of cutting noodle strings, regardless of the lengths thereof, without scattering the noodle strings.

Solution to Problem

As a result of diligent research to achieve the object described above, the inventors of the present invention have discovered that a noodle string treatment apparatus capable of realizing the following steps is effective.

The inventors of the present invention have found out that it is effective to change a blade edge peripheral speed of a rotary blade during the rotation of the rotary blade. The inventors of the present invention have discovered that, by changing the blade edge peripheral speed, a batch of noodle strings can be cut at a blade edge peripheral speed at which the noodle strings can effectively be prevented from scattering.

In other words, a noodle string treatment apparatus according to an aspect of the present invention is "a noodle string treatment apparatus that has: a cutting device having a rotary blade and cutting a batch of noodle strings into a predetermined length; and a control device for controlling a blade edge peripheral speed of the rotary blade, wherein the control device changes the blade edge peripheral speed of the rotary blade during rotation thereof."

The inventors of the present invention have also found out that the batch of noodle strings can be cut stably by allowing the batch of noodle strings, which is not yet cut, between rollers with a certain clearance therebetween, in order to prevent the noodle strings from flapping or coming apart and to neatly arrange the condition of the batch of noodle strings.

Specifically, the noodle string treatment apparatus according to the aspect is "the noodle string treatment apparatus further including a noodle string stabilizing roller."

Next, the one with two or more rotary blades can rotate by a small rotation angle between a cut and the next cutting, and can perform the next cut promptly.

In other words, the noodle string treatment apparatus according to the aspect is "the noodle string treatment apparatus, wherein the cutting device has two or more of the rotary blades."

The blade edge peripheral speed of the rotary blades changes within a time period between the cut and the next. The blade edge peripheral speed obtained at the time of cutting noodle strings is set at a speed that is one to four times a speed at which the noodle strings are sent to be cut, i.e., the speed of noodle strings. Therefore, the noodle strings can be cut favorably.

Specifically, the noodle string treatment apparatus according to the aspect is "the noodle string treatment apparatus, wherein the blade edge peripheral speed of the rotary blade changes and becomes one to four times a noodle string speed at the time of cutting noodle strings, within a time period between a cut and a next."

The speed conditions for cutting the noodle strings are always the same, by periodically changing the blade edge peripheral speed under the condition that a time period from one cutting point to the subsequent cutting point is one cycle. As a result, the noodle strings can be cut every time under the favorable speed conditions.

In other words, the noodle string treatment apparatus according to the aspect is "the noodle string treatment apparatus, wherein the control device changes the blade edge peripheral speed of the rotary blade periodically under a condition that a time period from one cutting point to a subsequent cutting point is one cycle."

The inventors of the present invention have also discovered that the noodle strings can be prevented from scattering, by setting the blade edge peripheral speed obtained when extruding a batch of cut noodle strings (immediately after each cutting point) to be lower than the blade edge peripheral speed obtained at each cutting point.

That is, the noodle string treatment apparatus according to the aspect is "the noodle string treatment apparatus, wherein the control device sets the blade edge peripheral speed of the rotary blade for extruding the batch of noodle strings that has been cut, to be lower than the blade edge peripheral speed of the rotary blade obtained at each cutting point."

The inventors of the present invention have further found out that, when there is formed a region where the blade edge peripheral speed becomes constant at its minimum value, cutting the noodle strings at this region can prevent the noodle strings from scattering. The noodle strings can be prevented from scattering, because the noodle strings can be cut when the blade edges become stable at low speeds. On the other hand, the rotary blades can be rotated at high speeds between the cutting points, thereby cutting the noodle strings promptly.

In other words, the noodle string treatment apparatus according to the aspect is "the noodle string treatment apparatus, wherein, when there is formed a region where the blade edge peripheral speed becomes constant at a minimum value thereof, the control device sets the cutting point in the region."

The noodle string treatment apparatus further includes a device that executes the following steps. First, after being steamed by using a usual method, the noodle strings are sent from a carrying conveyor to a stretching conveyor. Subsequently, in order to prevent the noodle strings from scattering at the time of cutting the noodle strings, the noodle strings are showered with water or frying oil to have weight and become less viscous.

Specifically, the noodle string treatment apparatus according to the aspect is "the noodle string treatment apparatus, further including: a conveyor for conveying the batch of noodle strings that has been steamed or boiled by a usual method; a stretching conveyor that has a higher conveying speed than the conveyor and is used to stretch the batch of noodle strings; a shower device for showering the batch of noodle strings with water or oil; and a device for placing the batch of noodle strings that has been cut, in a predetermined retainer."

The applicant of the present invention intends to provide a noodle string treatment method that can be realized by the noodle string treatment apparatus described above.

That is, a noodle string treatment method according to an aspect is "a noodle string treatment method having the steps of: conveying a batch of noodle strings; controlling a blade edge peripheral speed of a rotary blade and cutting the batch of noodle strings into a predetermined length; and placing the batch of noodle strings that has been cut, in a predetermined retainer, wherein in the step of cutting the batch of noodle strings, the blade edge peripheral speed of the rotary blade is changed during rotation thereof"

In the treatment steps described above, the blade edge peripheral speed obtained at the time of cutting the noodle strings as described above is set at a speed that is one to four times the noodle string speed. Therefore, the noodle strings can be cut favorably.

Specifically, the noodle string treatment method according to the aspect is "the noodle string treatment method, wherein the blade edge peripheral speed of the rotary blade in the step of cutting the batch of noodle strings changes within a time period between a cut and a next and becomes one to four times a noodle string speed at the time of cutting the noodle strings."

The speed conditions for cutting the noodle strings are always the same, by periodically changing the blade edge peripheral speed under the condition that a time period from one cutting point to the subsequent cutting point is one cycle. As a result, the noodle strings can be cut every time under the favorable speed conditions.

In other words, the noodle string treatment method according to the aspect is "the noodle string treatment method, wherein in the step of cutting the batch of noodle strings, the blade edge peripheral speed of the rotary blade is changed periodically under a condition that a time period from one cutting point to a subsequent cutting point is one cycle."

The inventors of the present invention have also discovered that the noodle strings can be prevented from scattering, by setting the blade edge peripheral speed of extruding a batch of cut noodle strings (immediately after each cutting point) to be lower than the blade edge peripheral speed obtained at each cutting point.

That is, the noodle string treatment method according to the aspect is "the noodle string treatment method, wherein the blade edge peripheral speed of the rotary blade for extruding the batch of noodle strings that has been cut, is set to be lower than the blade edge peripheral speed of the rotary blade obtained at each cutting point."

The inventors of the present invention have further found out that, when there is formed a region where the blade edge peripheral speed becomes constant at its minimum value, cutting the noodle strings at this region can prevent the noodle strings from scattering. The noodle strings can be prevented from scattering, because the noodle strings can be cut when the blade edge becomes stable at low speeds. On the other hand, the rotary blade can be rotated at high speeds between the cutting points, thereby cutting the noodle strings promptly.

In other words, the noodle string treatment method according to the aspect is "the noodle string treatment method, wherein, when there is formed a region where the blade edge peripheral speed becomes constant at a minimum value thereof, the cutting point is set in the region."

The noodle string treatment method further includes the following steps. First, after being steamed by using a usual method, the noodle strings are sent from a carrying conveyor to a stretching conveyor. Subsequently, in order to prevent the noodle strings from scattering when being cut, the noodle strings are showered with water or frying oil to have weight and becomes less viscous.

Specifically, the noodle string treatment method according to the aspect is "the noodle string treatment method, further including the steps of: conveying the batch of noodle strings while stretching the batch of noodle strings; and showering the batch of noodle strings with water or oil."

Advantageous Effects of Invention

Use of the present invention can cut not only conventional long noodle strings but also short noodle strings without scattering them, which has been conventionally difficult. In other words, the present invention can cut noodle strings, regardless of the lengths thereof, without scattering them, and produce instant noodles of various lengths.

DESCRIPTION OF EMBODIMENTS

An example of an embodiment of a noodle string treatment apparatus according to the present invention is described hereinafter in detail with reference to the accompanying drawings. It should be noted that the present invention should not be construed as being limited to the embodiment. Changes can appropriately be made to the present invention without departing from the scope thereof First of all, a noodle string treatment apparatus according to the present embodiment is described with reference to FIG. 1.

Figure 1:
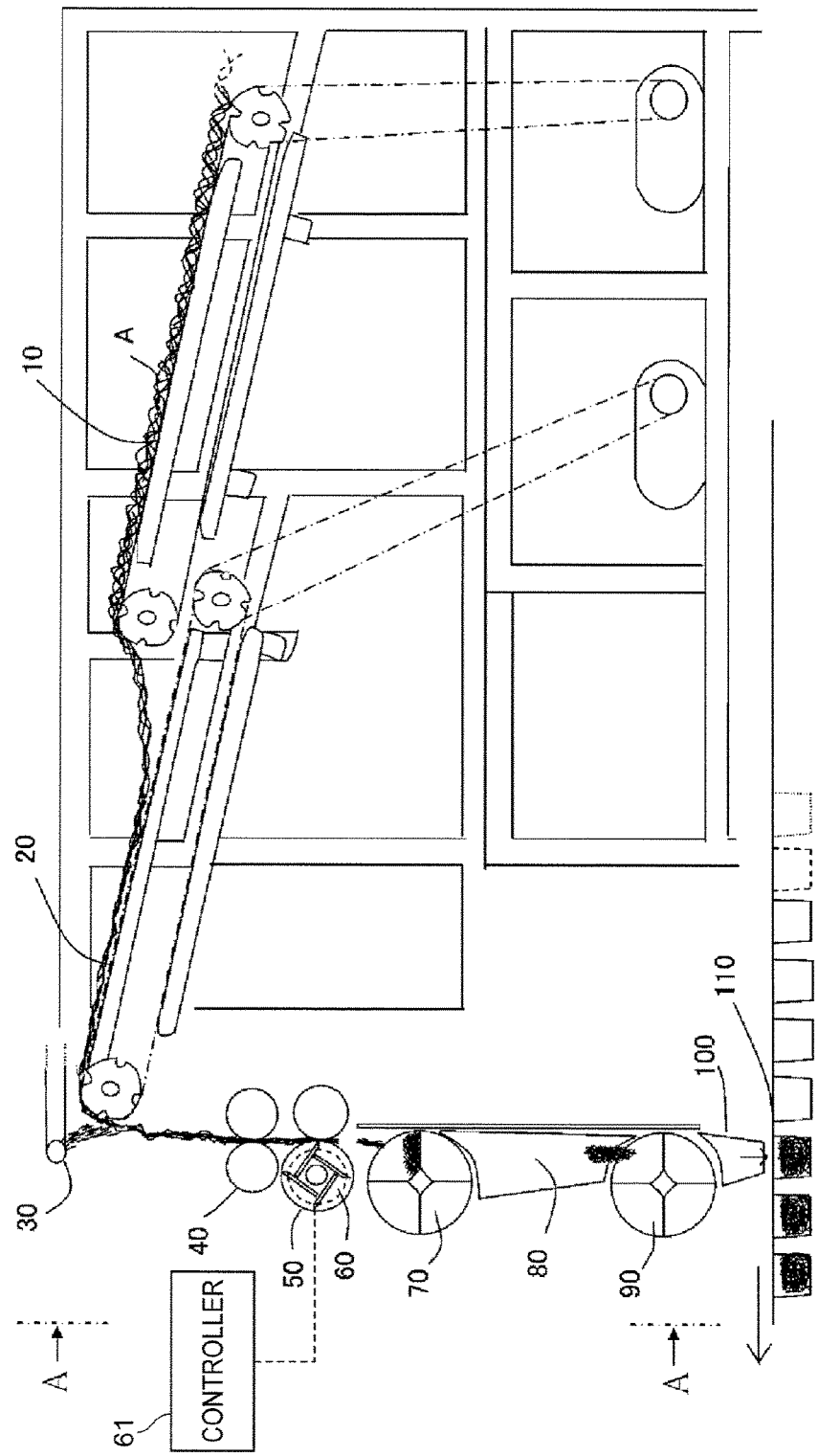
FIG. 1 is a schematic diagram showing an example of the entire noodle string treatment apparatus according to an embodiment of the present invention.

As shown in FIG. 1, the noodle string treatment apparatus according to the present embodiment produces a noodle band by rolling dough that is produced from flour and water, and slices and braises or boils the noodle band to obtain noodle strings, in an instant noodle production step.

As shown in FIG. 1, the noodle string treatment apparatus of the present embodiment has a carrying conveyor 10 for conveying the braised or boiled noodle strings, a stretching conveyor 20 that is connected to a lower side of an end of the carrying conveyor 10 and stretches the wave-like noodle strings, a shower device 30 provided above an end part of the stretching conveyor 20, a noodle string stabilizing roller 40 that is disposed below the stretching conveyor 20 and bundles a batch of the braised or boiled noodle strings that is carried from the stretching conveyor 20, a cutting device 50 that is disposed below the noodle string stabilizing roller and cuts the noodle strings, a control device 60 for controlling a blade edge peripheral speed of a rotary blade of the cutting device, and a device (a first waterwheel in the diagram) 70 for placing the batch of the cut noodle strings in a predetermined retainer. A sorting chute 80 is provided under the first waterwheel 70. A second waterwheel 90 is provided under the chute, and retainers 110 are provided below the second waterwheel 90. The noodle strings are brought to the retainers 110 through a hopper 100.

Specific configurations and operations of the noodle string treatment apparatus are described hereinafter.

—A Batch of Noodle Strings to make Instant Noodles—

Instant noodles are generally produced as follows. In other words, flower, starch or the like is mixed with water to obtain dough, which is then compounded into a noodle band. Next, the noodle band is thinly stretched in a rolling step. The rolled noodle band is sliced into noodle strings by a slicing roller. The noodle strings are braised or boiled and thereby gelatinized. The noodle strings may be subjected to superheated steam in order to be gelatinized. After being flavored according to need, the noodle strings are cut by the rotary blade or the like. The cut noodle strings are stored in the retainers and dried by the heat of oil or hot air. As a result, chunks of instant noodles are completed.

Of the batches of noodle strings described above, the batch of noodle strings that is treated in the present embodiment is the batch of noodle strings that is sliced, braised and gelatinized or the batch of noodle strings that is flavored according to need.

The batch of noodle strings that is treated in the present embodiment can be any noodles such as Chinese noodles, udon noodles, soba noodles, past, or the like. The noodle string treatment apparatus according to the present embodiment can be used for any type of noodles regardless of the shapes thereof, such as wave-like noodles or straight noodles.

—Carrying Conveyor and Stretching Conveyor—

The present embodiment describes procedures for treating the batch of noodle strings. First, the carrying conveyor 10 conveys the noodle strings that are braised in a previous step and flavored according to need in the previous step. The braised or boiled noodle strings are moved to the stretching conveyor 20 by the carrying conveyor 10. The conveying speed of the stretching conveyor 20 is higher than that of the carrying conveyor 10. After being conveyed by the carrying conveyor, the batch of noodle strings A is moved to the stretching conveyor 20 and at the same time stretched into straight lines by the stretching conveyor 20. Consequently, the noodle strings are loosened favorably, so that the length of the noodle strings can be made constant after the noodle strings are cut. The ratio of speeds between the carrying conveyor 10 and the stretching conveyor 20 is set appropriately based on the type, diameter and the like of the noodle strings. For example, the ratio is preferably approximately 1:4 at which the noodle strings are not cut. The configurations of the carrying conveyor and the stretching conveyor are not limited to the configurations described above. A device of different configuration may be employed as a device for conveying a batch of noodle strings. The noodle string treatment apparatus does not have to be provided with the conveying device. In this case, a conveying device, independent of the noodle string treatment apparatus, may be used in combination with the noodle string treatment apparatus.

—Shower Device—

In the present embodiment, a water or frying oil shower device 30 is provided. This device is disposed above the end part of the stretching conveyor 20. The shower device 30 applies water or oil to the noodle strings that are sent from the stretching conveyor 20, adding water or oil to the noodle strings. Consequently, at the time of a cut that is described hereinafter, the weight of the noodle strings and the lowered viscosity of the noodle strings can prevent the noodle strings from scattering at the time of the cut.

Although not particularly limited, the amount of water to be applied to the noodle strings may be approximately 10 to 100 cc per 100-gram noodle strings. The same is true for the oil.

Furthermore, the shower device has the effect of preventing the noodle strings from sticking to each other even when the noodle strings contain a large amount of starches and thus cannot be loosened easily, as well as the effect of evenly filling each retainer. The shower device also has the effect of preventing damage to the noodle strings when loosening the noodle strings in a subsequent step. The configuration of the shower device is not limited to the one described above. A device of different configuration may be employed as the device for showering a batch of noodle strings. The noodle string treatment apparatus itself does not have to be provided with the shower device. In this case, a shower device, independent of the noodle string treatment apparatus, may be used in combination with the noodle string treatment apparatus.

—Noodle String Stabilizing Roller—

The noodle string stabilizing roller 40 is also provided in the present embodiment. The noodle string stabilizing roller 40 is configured by a combination of two rotating rollers facing each other. In the present embodiment, as indicated by the reference numeral 40 in FIG. 3, a first rotating roller 41 and second rotating roller 42 are disposed with a predetermined clearance therebetween. The noodle strings that are conveyed from the abovementioned stretching conveyor 20 are caused to pass through the clearance of the rotating noodle string stabilizing roller 40. As a result, the batch of noodle strings is prevented from flapping or shifting. That is, the noodle string stabilizing roller 40 operates to prevent the noodle strings from entangling when being sent to the cutting device 50 described below, and prevent the noodle strings from scattering at the time of the cut performed by the cutting device. At the same time, the noodle string stabilizing roller 40 also operates to stabilize the noodle strings so that the noodle strings can be cut into a constant length.

It goes without saying that the noodle string stabilizing roller 40 does not have to be provided with the required components in other aspects. The clearance may specifically be approximately 5 mm to 20 mm, depending on the thickness of the noodle strings.

—Cutting Device and Control Device for Controlling Blade Edge Peripheral Speed of Rotary Blade—

Figure 3:
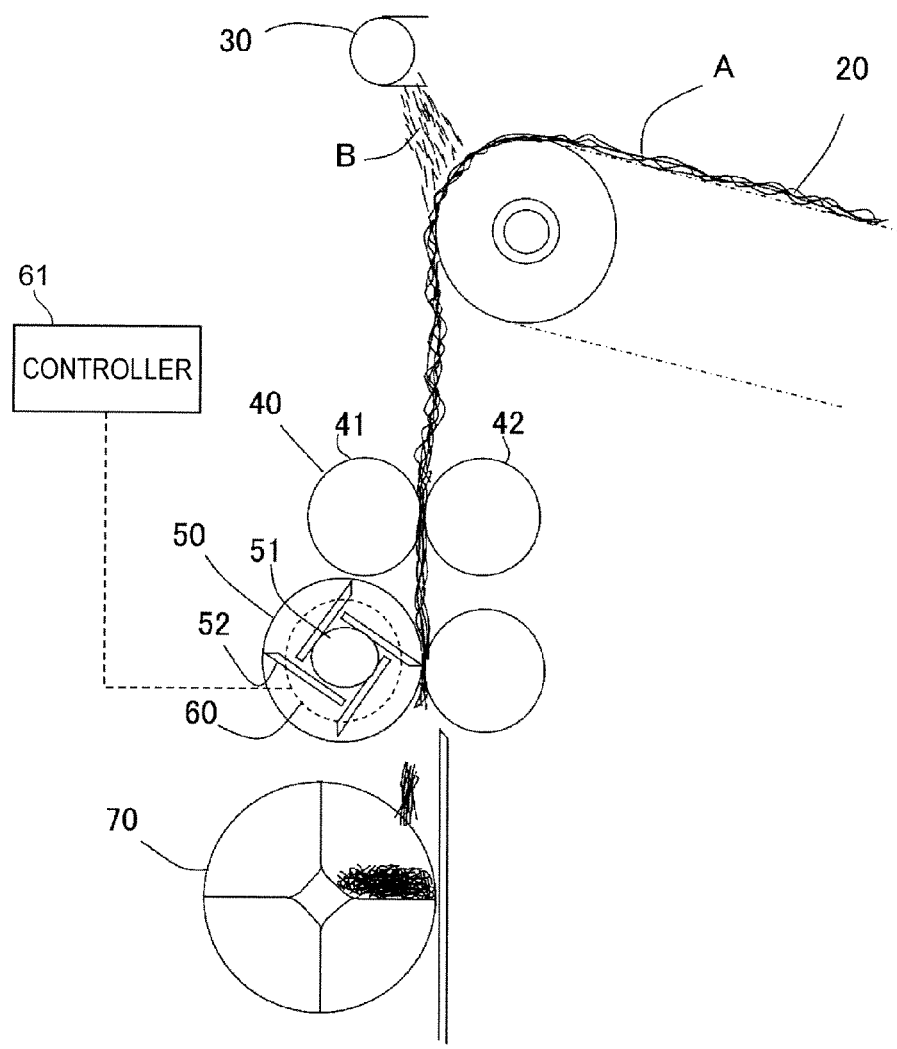
FIG. 3 is a schematic diagram showing a part of the noodle string treatment apparatus.

After passing through the noodle string stabilizing roller 40, the batch of noodle strings reaches the cutting device. In the present embodiment, the cutting device has a configuration in which rotary blades 52 are fixed to a rotating shaft 51 at an angular interval of 90°, as shown in FIG. 1 or 3. In the present embodiment, the flat rotary blades 52 are fixed at positions that are set on an outer circumferential surface of the rotating shaft 51 in a circumferential direction at a constant interval. Thus, the blade edges of the rotary blades 52 are disposed at a constant interval around a central axis line of the rotating shaft 51. When the cutting device 50 has N rotary blades 52, the blade edges of the rotary blades 52 are disposed at an interval of 360°/N around the central axis line of the rotating shaft 51. The distances from the central axis line of the rotating shaft 51 (radius of the rotary motion) to the blade edges of the rotary blades 52 are equal to each other. The batch of noodle strings passes between the cutting device 50 and a corresponding roller. The batch of noodle strings is cut when the blade edge of one of the rotary blades 52 faces an outer circumferential surface of the corresponding roller.

The present embodiment illustrates the case in which four rotary blades 52 are provided in the cutting device 50; however, the number of rotary blades 52 is not particularly limited. However, in terms of reducing the time period between a cut and the subsequent cut, it is preferred that two or more of the rotary blades 52 be provided, because it is more advantageous to reduce the rotation angle between a cut and the subsequent cut.

In terms of adjusting or maintaining each of the rotary blades 52, it is preferred that approximately three or four of the rotary blades 52 be provided. In the present embodiment, noodle strings as short as approximately 1 to 7 cm need to be sliced. When producing noodle strings at the conventional noodle string sending speed, the number of cuts needs to be increased. When increasing the number of cuts, the number of rotations of the rotating shaft 51, which is, the rotary blade edge peripheral speed of the rotary blades 52, needs to be increased.

However, simply increasing the blade edge peripheral speed of the rotary blades 52 rotating at a constant speed might cause the noodle strings to scatter at the time of cutting the noodle strings. In other words, in the present embodiment, the noodle strings that are cut by the rotary blades 52 need to be stored in the frame of the waterwheel 70, as shown in FIG. 3. However, when the blade edge peripheral speed of the rotary blades 52 is high, the noodle strings scatter, forcing some of the noodle strings out of the frame of the waterwheel 70.

It is, therefore, effective to perform control for changing the blade edge peripheral speed of the rotary blades 52 during the rotation thereof. In order to perform the control, the control device 60 for controlling the blade edge peripheral speed is provided in the cutting device 50 having the rotary blades 52. Various control methods can be adopted as the control device 60. The present embodiment, however, illustrates a method for changing the angular velocity of the rotary blades to control the blade edge peripheral speed by controlling the angular velocity of the rotary blades by means of a servomotor. Not only a servomotor but also a mechanical decentering mechanism or the like can be used as the method for changing the blade edge peripheral speed.

When using a servomotor and so on, the control device 60 further has a controller 61. The controller 61 is an arithmetic unit for transmitting a control signal to the control device 60 (a servomotor, etc.) and receiving signals from various sensors. The controller 61 may have an input part or a display part to which an operator can input operating conditions and the like. Examples of the controller 61 include a PLC, a servo amplifier, and other control devices. The controller 61 is electrically connected to a drive part such as the servomotor of the control device 60. The controller 61 is also electrically connected to other electronic devices of the noodle string treatment apparatus 1 (each motor, each actuator, each sensor, etc.) so as to be able to transmit/receive signals. For this reason, the controller 61 may control the entire noodle string treatment apparatus 1. Note that each of the diagrams shows the connection between the controller 61 and the control device 60 (drive part) but does not show the connection between the other parts. The controller 61 sets a setting speed of the blade edge peripheral speed of the rotary blades 52 and outputs a control signal based on the setting speed to the drive part of the control device 60. The controller 61 can also set cutting points with respect to the changing blade edge peripheral speed. In other words, the controller 61 can set the conditions of the speed of the blade edges (the blade edge peripheral speed, acceleration thereof, etc.) of the rotary blades 52 in relation to a time point at which the blade edges cut batches of noodle strings. In the examples shown in FIGS. 4 and 5, the controller 61 can set the cutting points at any phases so as to correspond to the waveforms illustrating the blade edge peripheral speed.

In the present embodiment, "cutting points" are each a point where the blade edges of the rotary blades 52 are the closest to (or come into contact with) the outer circumferential surface of the corresponding roller. In the present embodiment, because the blade edges of the N rotary blades 52 are disposed at an interval of 360°/N, the cutting points are also set at an interval of 360°/N. In case of four rotary blades 52, the difference in rotation angle between one cutting point and the next cutting point is 90°. Immediately before reaching a cutting point, the blade edge of the rotary blade 52 wedges into (cuts into) the batch of noodle strings. Immediately after passing the cutting point, the blade edge of the rotary blade 52 pushes down (scrapes) the batch of the cut noodle strings. When the noodle strings are short and highly viscous, the noodle strings might stick to the blade edges past the cutting points. In other words, the batch of noodle strings might separate from the blade edge after each rotary blade 52 rotates by a small angle from the cutting point. By controlling the blade edge peripheral speed of each rotary blade at a cutting point and the blade edge peripheral speed of the rotary blade before and after the cutting point, the controller 61 can prevent the batch of the cut noodle strings from scattering.

Control of the blade edge peripheral speed is described specifically hereinafter. In case of four rotary blades, while the blade edge peripheral speed was constant in a conventional cutting method as shown in FIG. 4(a), in the present embodiment, for example, it is effective to keep the blade edge peripheral speed high and low for certain periods of time in a cycle where each rotary blade rotates 90 degrees, as shown in FIG. 4(b). When controlling and changing the blade edge peripheral speed precisely (i.e., when the blade edge peripheral speed of the control signal of the controller 61 is substantially equal to the actual blade edge peripheral speed of the rotary blades 52), it is preferred to use a method for cutting the noodle strings when the blade edge peripheral speed is low. Cutting the noodle strings at the low blade edge peripheral speed can prevent the noodle strings from scattering.

Specifically, not only a method for cutting the noodle strings at the lowest blade edge peripheral speed and steady state as shown in FIG. 4(b), but also an aspect of cutting the noodle strings when the blade edge peripheral speed stops dropping as shown in FIG. 4(c), and an aspect of cutting the noodle strings during a time period in which the blade edge peripheral speed decreases as shown in FIG. 4(d), can be effective.

Especially in the aspect of cutting the noodle strings during a time period in which the blade edge peripheral speed decreases as shown in FIG. 4(d), because the cut noodle strings tend to be viscous and follow the motions of the cutting blades, the cut noodle strings can effectively be prevented from scattering, due to the decrease in the moving speed thereof.

As described above, the method for changing the angular velocity to control the blade edge peripheral speed can prevent the noodle strings from scattering at the time of the cut, while securing a predetermined number of cuts.

Figure 4:
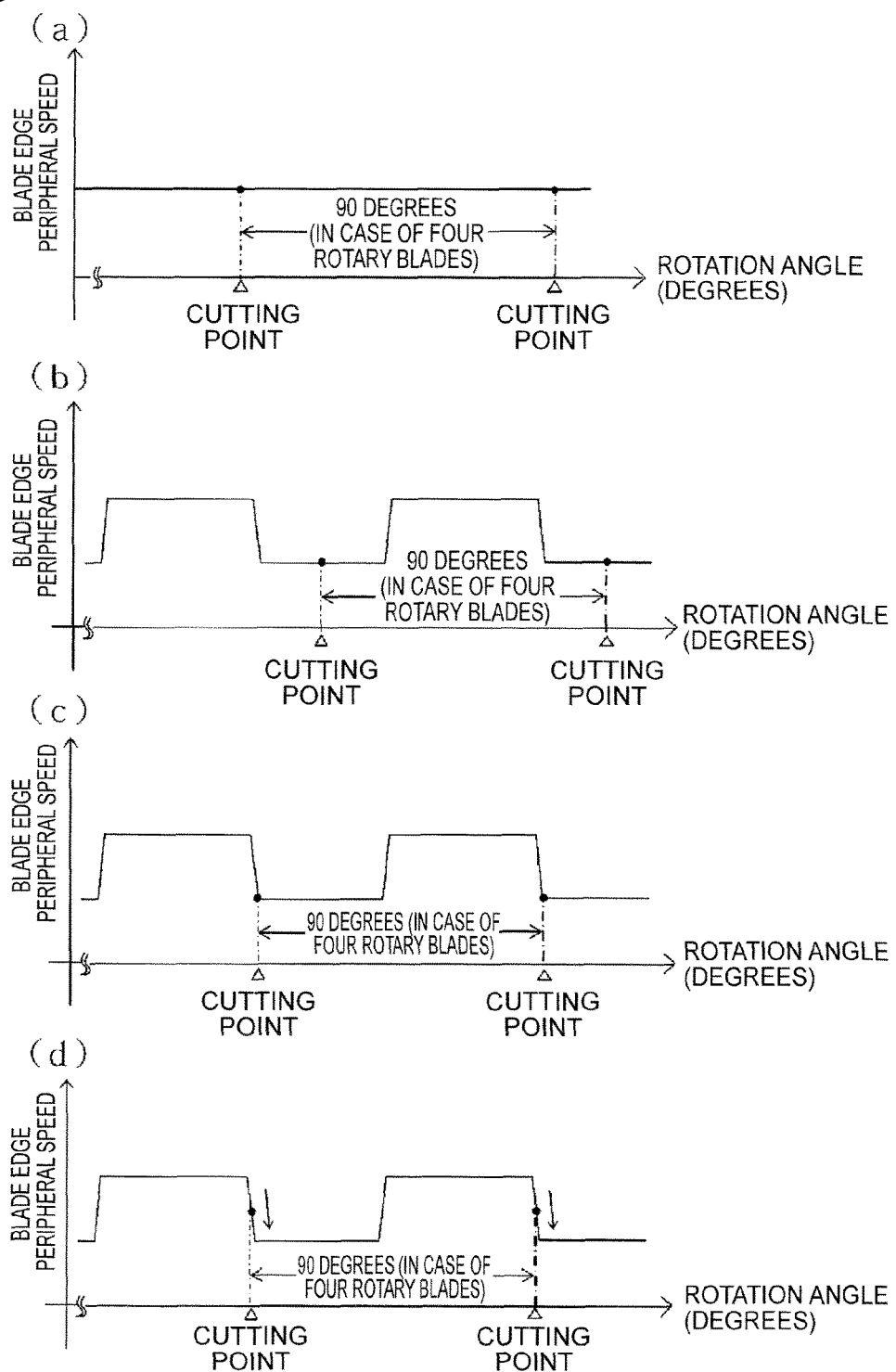
FIG. 4 is a diagram showing changes in blade edge peripheral speed.
Figure 5:
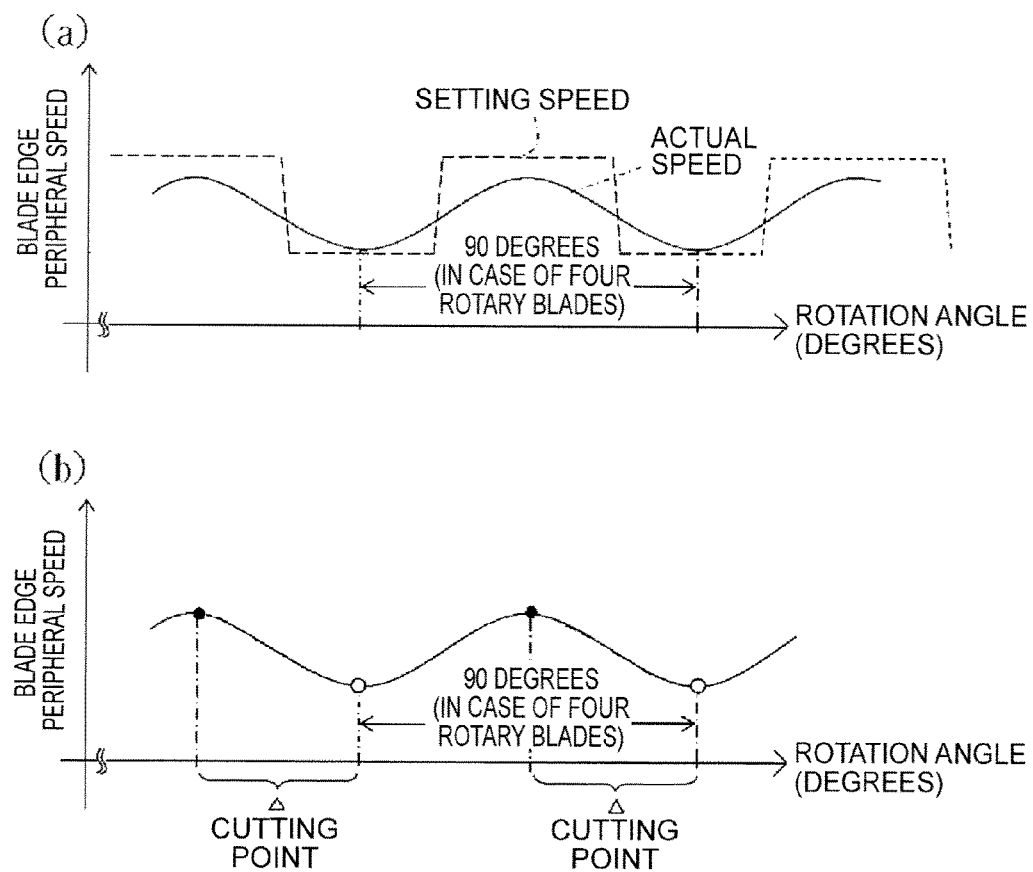
FIG. 5 is a diagram showing changes in blade edge peripheral speed.

Note that the control device 60 can periodically change the blade edge peripheral speed of the rotary blades 52 under the condition that a time period from one cutting point to the next cutting point is one cycle. In case of four rotary blades 52, the blade edge peripheral speed changes on a 90° cycle (the blade edge peripheral speed changes under the condition that a time period required for each rotary blade 52 to rotate 90° is one cycle). FIGS. 4 and 5 show graphs in each of which the abscissa represents the rotation angle of the rotating shaft 51 and the ordinate the blade edge peripheral speed.

Each of the rotary blades 52 is usually made from metal such as stainless and relatively heavy, and rotates at a high speed in order to ensure the speed for producing noodle strings. Therefore, the blade edge peripheral speed of the control signal is sometimes different from the actual blade edge peripheral speed of the rotary blade 52 due to inertial force and the like. For instance, even when the blade edge peripheral speed is as shown in FIGS. 4(a) to 4(d) due to the control settings, the actual blade edge peripheral speed of the rotary blade might show a gentle curve due to inertial force and the like, as shown in FIG. 5(a).

In the example shown in FIG. 5(a), the curve showing the changes of the blade edge peripheral speed with respect to the rotation angle has the local maximum values and the local minimum values. Each of the local maximum values represents the highest blade edge peripheral speed, and each of the local minimum values the lowest blade edge peripheral speed. In such an example, each of the cutting points set by the control device 60 is a region between the local maximum value and the local minimum value, and each cutting point is preferably set in a region excluding the local minimum value, as shown in FIG. 5(b). In other words, it is preferred that the rotary blades 52 cut the noodle strings in a region between the maximum blade edge peripheral speed and a point immediately before the minimum blade edge peripheral speed (i.e., the maximum speed shown by a black dot is included, but the minimum speed shown by a white dot is not included). When a cutting point is set at a position where the blade edge peripheral speed is the local maximum value (the maximum speed), the blade edge peripheral speed decreases in a small section past the cutting point. When a cutting point is set at a position where the blade edge peripheral speed is the local minimum value (the minimum speed), the blade edge peripheral speed increases in a small section past the cutting point.

In such a region, the rotary blades 52 are in a state in which the blade edge peripheral speed gradually drops. Such an expression as "a state in which the blade edge peripheral speed gradually drops" means, in the present embodiment, a state in which the blade edge peripheral speed changes from its maximum speed to a point immediately before its minimum speed (the minimum speed is not included) when the blade edge peripheral speed changes in the form of a curved waveform as described above. That is, the control device 60 sets the blade edge peripheral speed of the rotary blade for pushing out the batch of the cut noodle strings, to be lower than the blade edge peripheral speed of the rotary blade 52 obtained at the cutting points. In the region mentioned above, the blade edge peripheral speed that is obtained after a lapse of a small period of time from the cutting point (at this moment, the rotary blade 52 pushes out the batch of the cut noodle strings) is slightly lower than the blade edge peripheral speed of the rotary blade 52 that is obtained at the cutting point. In other words, when the rotary blade 52 pushes out the batch of noodle strings immediately after cutting the batch of noodle strings (when the batch of noodle strings sticks to the blade edge and follows the motion of the blade edge), the speed of the rotary blade 52 is lower than that obtained at the cutting point. This can prevent the batch of the cut fine from scattering.

The method for using the control device 60 to control the blade edge peripheral speed is not particularly limited; thus, any control method may be adopted as long the operations described above can be realized.

Examples of the control method include the following method. The controller 61 sets the setting speed based on a cutting condition such as the number of cuts (e.g., sets the waveform shown by the dotted line in FIG. 5(*a*)), and outputs the control signal to the drive part. The controller 61 also collects the actual blade edge peripheral speeds of the rotary blades 52 based on the results of detection obtained from a sensor or the like attached to the cutting device 50. The controller 61 consequently acquires the actual changes in the blade edge peripheral speed of the rotary blades 52 (acquires, for example, the waveform shown by the solid line in FIG. 5(*a*)). Subsequently, the controller 61 sets the cutting points at time periods (rotation angles) corresponding to the actual changes in the blade edge peripheral speed. The controller 61 sets the cutting points so as to correspond to the optimum speed conditions (sets the cutting points at, for example, the regions indicated as "cutting points" in FIG. 5(*b*)). More specifically, the controller 61 can adjust the phases of the actual blade edge peripheral speed by adjusting the phases of the waveform of the setting speed and match the phases of the blade edge of each rotary blade 52 with the phases of the rotational positions. For example, as shown in FIG. 5(*b*), when the cutting point exists in the region from the minimum speed to the maximum speed, the controller 61 can move the cutting point to the region indicated as "cutting point," by adjusting the phase of the waveform of the setting speed (i.e., the waveform of the actual speed). Even when the cutting point is set within the region indicated as "cutting point," the controller 61 can adjust the cutting point within the region so as to correspond to more favorable speed conditions. The control described above may be performed automatically by the controller 61 (for example, after the operator inputs a desired cutting condition, the controller 61 automatically calculates the cutting points and performs the control), or may allow the operator to take over the operation in the middle of the control. For example, after acquiring the waveform of the actual blade edge peripheral speed, the controller 61 may display the waveform on a display to allow the operator to freely select the position of the cutting point (in so doing, the optimum region for setting the cutting point may be displayed clearly to the operator).

The control method described above is merely an example; thus, other control methods may be adopted. For instance, when producing noodle strings, the relationship between the waveform of the setting speed and the waveform of the actual speed may be obtained in the form of data, which may be stored in the controller 61, and, in the actual operation, the control device 60 may read the data to perform the control. In other words, the controller 61 can select an appropriate blade edge peripheral speed waveform or a set position of the cutting point in accordance with provided operating conditions, and read the setting speed at which these operations can be realized, from the accumulated data.

The control device 60 can change the blade edge peripheral speed of the rotating rotary blades, in the manner described above. As a result, by adjusting the cutting points, the noodle string treatment apparatus 1 can prevent the noodle strings from scattering at the time of cutting the noodle strings. Specifically, the noodle string treatment apparatus 1 can prevent, as much as possible, some of the noodle strings from being forced out of the frame of the waterwheel 70 as a result of scattering of the noodle strings. Even when the waterwheel is not used, the noodle string treatment apparatus 1 can prevent the noodle strings from scattering, and thereby reliably move the noodle strings to the device, other than the waterwheel, that places the noodle strings into the retainers.

As described above, the method for changing the blade edge peripheral speed at the time of cutting the noodle strings can perform high-speed treatment without reducing the speed of treating the noodle strings. As a result, the amount of production per certain time period can be kept at the same level as the prior art, realizing the same manufacturing efficiency as the case where noodle strings of normal length are produced.

The blade edge peripheral speed is described next. Although specific blade edge peripheral speed is not particularly limited, the blade edge peripheral speed of the rotary blades when cutting the noodle strings is preferably a speed that is approximately one to four times a speed at which the noodle strings are sent to be cut, i.e., a noodle string speed.

For example, when the noodle string speed is 5 to 15 m/min, the blade edge peripheral speed of cutting the noodle strings is preferably within a range of 5 to 60 m/min.

—Devices for Placing Batches of the Cut Noodle Strings into Predetermined Retainers—In the present embodiment, a batch of the cut noodle strings passes through various devices before being placed in each of the drying retainers 110. In the present embodiment, the batch of the cut noodle strings is divided into segments of constant width, which are stored in the first waterwheel 70.

The first waterwheel 70 can store therein the noodle strings of approximately 1 to 7 cm in length, which are delivered one after the other and sliced a number of times by the cutting device 50. The first waterwheel 70 can be stopped until the weight of the batch of noodle strings corresponds to one serving. Subsequently, the first waterwheel 70 that has one serving of noodle strings is rotated, whereby the noodle strings are sent to the sorting chute 80.

The sorting chute 80 can increase the interval between batches of noodle strings. Therefore, the batches of noodle strings can be moved in accordance with the intervals of pads of the retainers 110.

It is preferred that the sorting chute 80 be sectioned into the number corresponding to the number of rows of the retainers 110 and be shaped so as to taper downward in a manner that the inner diameter thereof decreases gradually. The bunch of noodle strings that have passed through the sorting chute 80 are somewhat formed into a bundle.

The present embodiment is configured such that the batch of noodle strings is stored from the chute 80 to the second waterwheel 90.

Once the noodle strings are stored in the second waterwheel 90, the time for the noodle strings to be moved can be adjusted. In other words, when the noodle strings are dropped from the sorting chute 80 and directly stored in the retainers 110 without passing through the second waterwheel 90, the point of time at which the noodle strings are stored might fluctuate. However, when the noodle strings can be stored once in the second waterwheel 90, such fluctuation can be adjusted, and at the same time the segments of the bunch of noodle strings can be dropped into the corresponding retainers 110 simultaneously by rotating the second waterwheel 90. As a result, the point of time at which the bunch of noodle strings is stored in the retainers 110 can be prevented from fluctuating.

Note that the present embodiment describes the combination of a waterwheel, a chute, and a second waterwheel as "the devices for placing the noodle strings into the retainers." However, the configuration of the present embodiment is not limited thereto. That is, the chute or the second waterwheel does not have to be provided.

A simple configuration without the waterwheels may be adopted. For example, the noodle strings may be slid down the cutting device to the retainers. Hollow pipes capable of guiding batches of cut noodle strings into the retainers may be disposed.

The configurations of the devices for placing noodle strings into the retainers are not limited to the ones described above. Devices of different configurations may be employed as the devices for placing noodle strings into the retainers. Furthermore, the noodle string treatment apparatus itself may not be provided with the devices for placing noodle strings into the retainers. In such a case, a noodle string placing device, independent of the noodle string treatment apparatus, may be used in combination with the noodle string treatment apparatus.

—Treatment of Noodle Strings Treated by Noodle String Treatment Apparatus—

The noodle strings that are treated by the noodle string treatment apparatus of the present embodiment are placed into the retainers 110 and fried or dried with hot air. When the middle section of the bunch of noodle strings stored in each retainer 110 swells up, a pressing member of a filling device may be used for pressing the middle section downward, while the retainer is conveyed by the conveyor. Moreover, an air loosening device using compressed air may be used to make the bunch of noodle strings uniform.

The noodle strings stored in the retainers can be subjected to drying treatment using heat of oil or hot air. Instant noodles that are obtained as a result of drying the noodle strings can be restored to the original state thereof by means of an ordinary cooking method, i.e., by pouring hot water or boiling. Another possible method is to pour water onto the instant noodles in a cup or the like and cook it in a microwave.

It is difficult for the conventional technologies to cut noodle strings of approximately 1 to 7 cm in length without scattering them. However, the noodle string treatment apparatus and method according to the present embodiment can cut short noodle strings of approximately 1 to 7 cm in length and store a required amount thereof in a predetermined retainer without scattering the noodle strings at the time of cutting them. Note that the adjustment of the blade edge peripheral speed can treat noodle strings to obtain not only the short length described above, but also the conventional length of approximately 20 to 70 cm. In other words, the noodle string treatment apparatus and method according to the present embodiment can cut long noodle strings and short noodle strings without scattering them. Thus, the noodle string treatment apparatus and method according to the present embodiment can cut noodle strings, regardless of the lengths thereof, without scattering the noodle strings, and produce instant noodles of various lengths.

EXAMPLES

Examples of the present invention are described specifically hereinafter. However, the present invention should not be construed in a limited way by these examples.

[Noodle String Treatment Apparatus]

Figure 2:
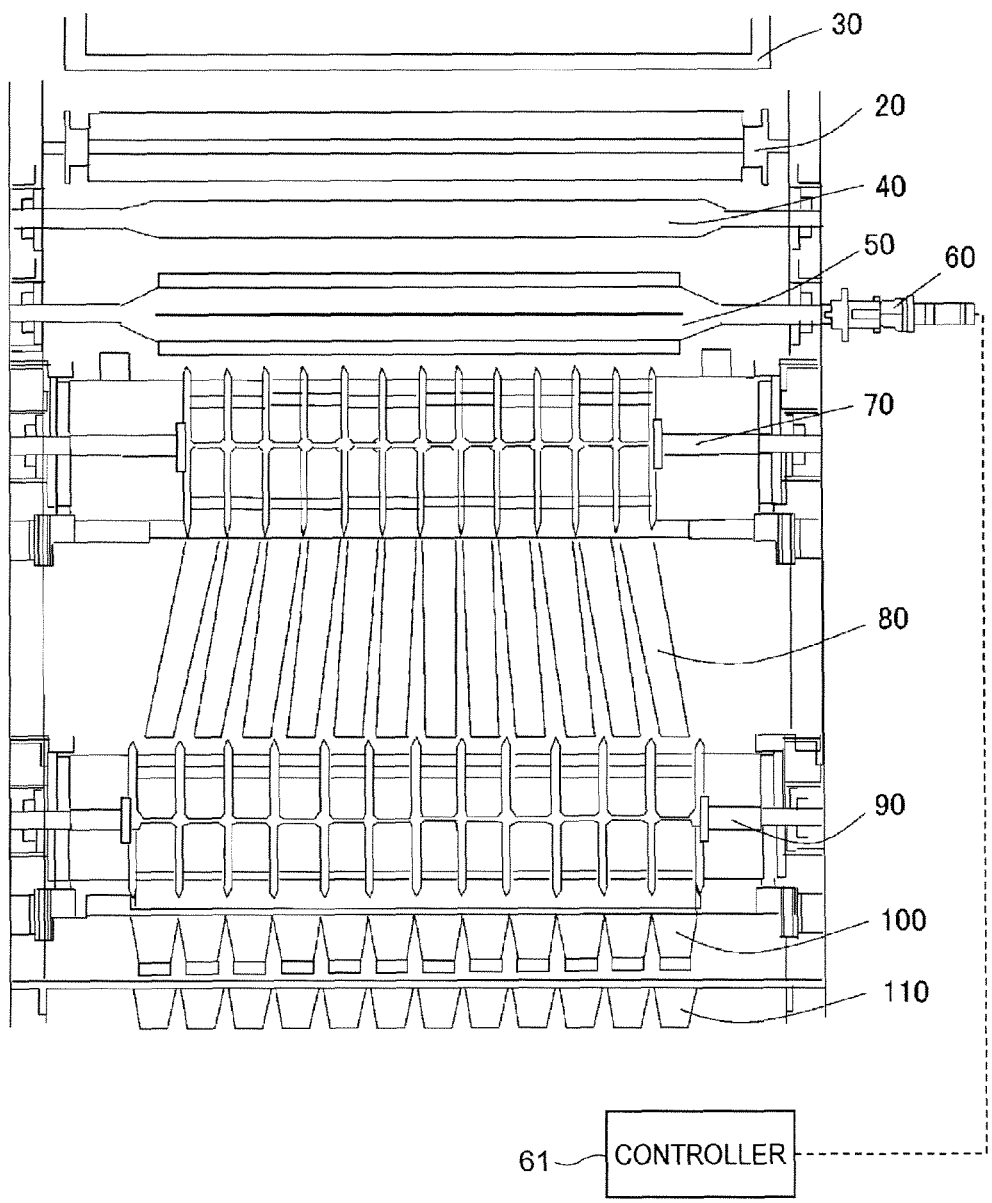
FIG. 2 is an arrow view of the noodle string treatment apparatus shown in FIG. 1, taken along line A-A.

The noodle string treatment apparatus shown in FIGS. 1 and 2 was prepared in order to test how the blade edge peripheral speed changes when cutting noodle strings and how the cut noodle strings scatter.

Specifically, the noodle string treatment apparatus that is used in the examples has a conveyor for conveying a batch of steamed noodle strings, a stretching conveyor that has a higher conveying speed than the conveyor and stretches the batch of noodle strings, a shower device that is placed obliquely above a line where the stretching conveyor is installed and applies water or oil to the batch of noodle strings, a stabilizing roller for holding the noodle strings therebetween, the noodle strings being hung down from the stretching conveyor, and a cutting device that has four rotary blades for cutting the noodle strings that have passed through the stabilizing roller. This noodle string treatment apparatus has a control device for controlling the cutting device and controls the bladed edge peripheral speed by means of a servomotor.

The noodle string treatment apparatus also has a first rotary waterwheel that is disposed below the cutting device and receives the noodle strings that are cut short, a chute disposed under this waterwheel, a second waterwheel that receives the batch of noodle strings that has passed through the chute, and a retainer for receiving the batch of noodle strings that is sent thereto by the rotation of the second waterwheel.

The distance between a rotational central axis line and the blade edge of each of the rotary blades (four blades) is 62.8 mm (the diameter is 125.6 mm). The first waterwheel for receiving the cut noodle strings was disposed such that an opening thereof was positioned approximately 75 mm below the center of the rotary blade.

Using the noodle string treatment apparatus having its components disposed as described above, scattering of the noodle strings at different peripheral speeds of the rotary blades was tested.

The noodle strings used in the examples were obtained by slicing a noodle band of 1.4 mm in thickness with a 9th angle cutting blade and braising (at 100° C. for 90 seconds) the sliced noodles. Hot water was sprayed onto the resultant noodle strings from an upper part of the stretching conveyor. The resultant noodle strings were hung down and allowed to pass through the noodle string stabilizing roller. The cutting device used the rotary blades thereof to cut the noodle strings that have passed through the noodle string stabilizing roller.

[Evaluation Method]

The rotating speed of the rotary blades was controlled (the control device is a servomotor), and how the noodle strings scattered when being cut at each point was evaluated. Note that, in this evaluation, the probability that the cut noodle strings are dropped without entering the waterwheel was examined (scattering percentage).

Example 1

Scattering of the noodle strings at cutting points 1 to 8 at a blade edge peripheral speed of 6 to 77 m/min was evaluated. The speed conditions are shown in Table 2. A curve representing the changes of the blade edge peripheral speed of the rotary blades and the plurality of tested cutting points 1 to 8 are shown in the graph of FIG. 6(a). Table 2 below shows how the noodle strings scattered at the cutting points (scattering percentage). The scattering percentage was evaluated on a five-point scale, as shown in Table 1 below.

TABLE 1

| Scattering Percentage (%) | | Evaluation |
| --- | --- | --- |
| 0.0 to less than 1.0 | 5 | Good |
| 1.0 to less than 2.0 | 4 | ↑ |

TABLE 1-continued

| Scattering Percentage (%) | | Evaluation |
|---|---|---|
| 3.0 to less than 4.0 | 3 | ↑ |
| 4.0 to less than 5.0 | 2 | ↓ |
| 5.0 or higher | 1 | Poor |

TABLE 2

| Number | Speed vector upon cutting | Cutter rotating speed upon cutting [rpm] | Cutter blade edge peripheral speed upon cutting [m/min] | Scattering percentage evaluation | Cutter blade average rotating speed [rpm] | Cutter blade average speed [m/min] | Number of cuts [number of cuts/min] |
|---|---|---|---|---|---|---|---|
| 1 | Maximum speed | 195 | 77 | 5 | 100 | 39 | 400 |
| 2 | Speed decreasing | 165 | 65 | 5 | 100 | 39 | 400 |
| 3 | Speed decreasing | 120 | 47 | 5 | 100 | 39 | 400 |
| 4 | Speed decreasing | 50 | 20 | 5 | 100 | 39 | 400 |
| 5 | Minimum speed | 15 | 6 | 3 | 100 | 39 | 400 |
| 6 | Speed increasing | 85 | 34 | 1 | 100 | 39 | 400 |
| 7 | Speed increasing | 105 | 41 | 2 | 100 | 39 | 400 |
| 8 | Speed increasing | 145 | 57 | 1 | 100 | 39 | 400 |

—Results—

It is clear that the noodle string scattering percentage is extremely low in the cutting points 1 to 4 where the blade edge peripheral speed reaches the maximum speed and then drops. In the cutting points 5 to 8 where the blade edge peripheral speed increases from the minimum speed, on the other hand, the noodle string scattering percentage is higher, compared to the cutting points 1 to 4. Therefore, cutting the noodle strings during a period in which the blade edge peripheral speed decreases can prevent the noodle strings from scattering.

Example 2

Figure 6:
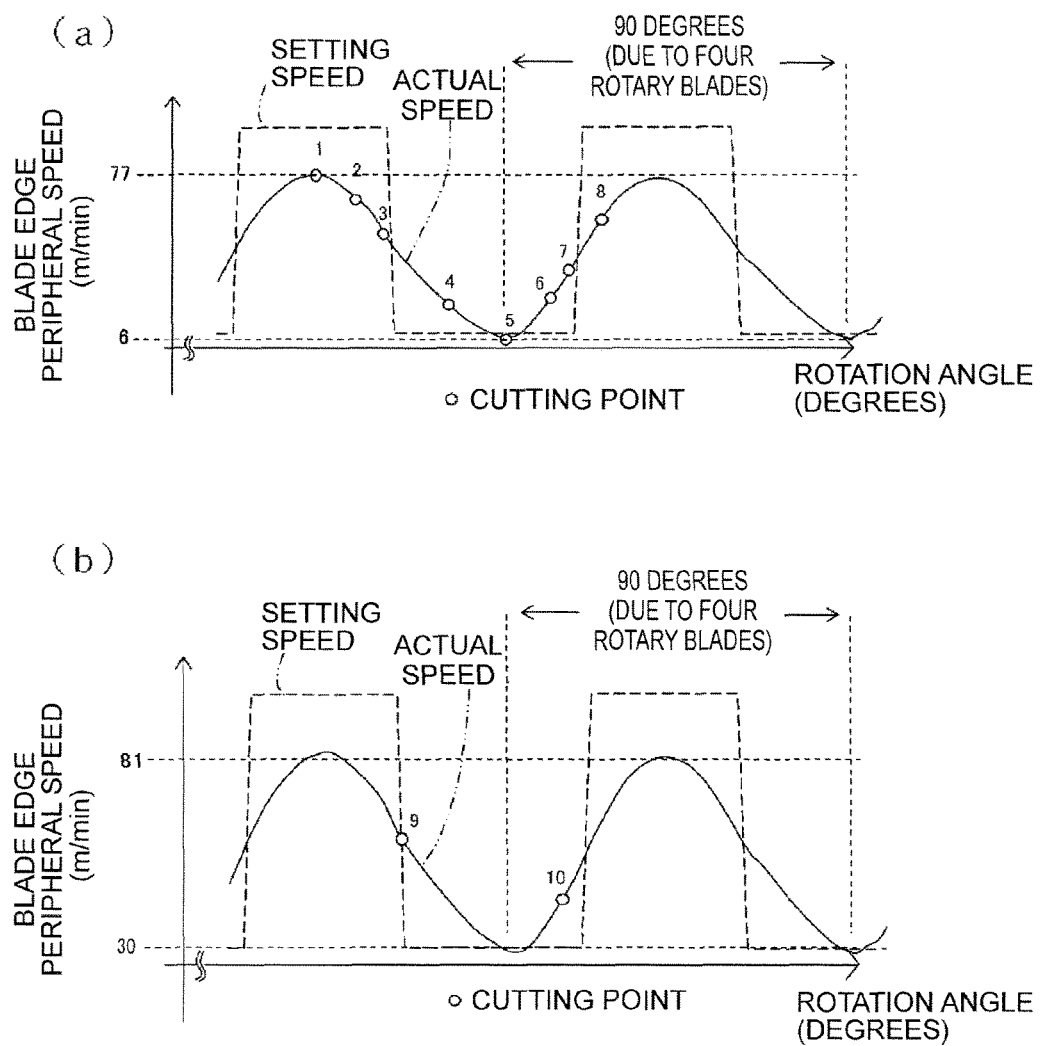
FIG. 6 is a diagram showing cutting points described in Examples 1 and 2.

Scattering of the noodle strings at a plurality of cutting points at a blade edge peripheral speed of 30 to 81 m/min was evaluated. The speed conditions are shown in Table 3. A curve representing the changes of the blade edge peripheral speed of the rotary blades and the plurality of tested cutting points 9 and 10 are shown in the graph of FIG. 6(*b*). Table 3 below shows how the noodle strings scattered at the cutting points (scattering percentage).

TABLE 3

| Number | Speed vector upon cutting | Cutter rotating speed upon cutting [rpm] | Cutter blade edge peripheral speed upon cutting [m/min] | Scattering percentage evaluation | Cutter blade average rotating speed [rpm] | Cutter blade average speed [m/min] | Number of cuts [number of cuts/min] |
|---|---|---|---|---|---|---|---|
| 9 | Speed decreasing | 155 | 61 | 5 | 148 | 58 | 590 |
| 10 | Speed increasing | 85 | 34 | 1 | 148 | 58 | 590 |

—Results—

As with Example 1, cutting the noodle strings during a period in which the blade edge peripheral speed decreases can prevent the noodle strings from scattering.

Regarding the number of cuts equal to the number of cuts of Example 2 (590 cuts/min), when cutting the noodle strings at a constant speed, the blade edge peripheral speed of the cutter blade is an average speed of 58 m/min. The scattering percentage when cutting the noodle strings at the constant speed was the scale 4. It is clearly understood that cutting the noodle strings during a period in which the blade edge peripheral speed decreases can prevent the noodle strings can be prevented from scattering when being cut, unlike when the noodle strings are cut at a constant speed.

Examples 1 and 2 show the results obtained when the blade edge peripheral speed was changed relatively significantly, such as the blade edge peripheral speeds of 6 to 77 m/min (Example 1) and 30 to 81 m/min (Example 2). In other tests as well in which a blade edge peripheral speed of 56 m/min was repeatedly changed periodically by plus and minus 8% to obtain blade edge peripheral speeds of approximately 52 to 60 m/min, scattering of the noodle strings was prevented by cutting the noodle strings when the blade edge peripheral speed dropped from the maximum speed (excluding the minimum speed).

INDUSTRIAL APPLICABILITY

The present invention can be used for cutting a batch of noodle strings.

REFERENCE SIGNS LIST

1 Noodle string treatment apparatus
10 Carrying conveyor
20 Stretching conveyor
30 Shower device
40 Noodle string stabilizing roller
41 First rotating roller
42 Second rotating roller
50 Cutting device
51 Rotating shaft
52 Rotary blade
60 Control device (servomotor)
61 Controller
70 First waterwheel
80 Chute
90 Second waterwheel
100 Hopper
110 Retainer
A Batch of noodle strings
B Showering with water or frying oil

The invention claimed is:

1. A noodle string treatment method, comprising steps of:
conveying a batch of noodle strings;
cutting the batch of noodle strings at a constant cutting time interval by using a rotary blade that has a flat shape, is attached to a rotating shaft and extends out from the rotating shaft; and
extruding the cut batch of noodle strings by the rotary blade, wherein:
a blade edge of the rotary blade extends along a direction in which the rotating shaft extends,
the rotary blade cuts the batch of noodle strings at a cutting point, which is a point where the blade edge of the rotary blade is closest to or comes into contact with an outer circumferential surface of an oppositely disposed roller,
in the step of cutting the batch of noodle strings, a blade edge peripheral speed of the rotary blade is changed during rotation thereof between a cut and a next cut,
in the step of cutting the batch of noodle strings, the batch of the noodle strings is cut at a position where a lengthwise direction of the batch of noodle strings extends in a vertical manner,
the rotary blades comprises a plurality of rotary blades attached to the rotating shaft,
in the step of cutting the batch of noodle strings, the blade edge peripheral speed of the plurality of rotary blades is changed periodically with a constant time interval over a plurality of cycles, wherein each of the plurality of cycles is a time period from one cutting timing by one of the plurality of rotary blades to a next cutting timing by another of the plurality of rotary blades cutting the batch of the noodle strings subsequent to the one of the plurality of rotary blades, and
the blade edge peripheral speed when one rotary blade among the plurality of rotary blades extrudes the cut batch of noodle strings after the one rotary blade cuts the batch of noodle strings is set to be lower than the blade edge peripheral speed of the rotary blade when the one rotary blade cuts the batch of noodle strings.

2. The noodle string treatment method according to claim 1, wherein the blade edge peripheral speed of the rotary blade in the step of cutting the batch of noodle strings changes within a time period between the cut and the next cut and becomes one to four times a noodle string speed at the time of cutting the noodle strings.

3. A noodle string treatment method, comprising steps of:
conveying a batch of noodle strings;
cutting the batch of noodle strings at a constant cutting time interval by using a rotary blade that has a flat shape, is attached to a rotating shaft and extends out from the rotating shaft; and
extruding the cut batch of noodle strings by the rotary blade, wherein:
a blade edge of the rotary blade extends along a direction in which the rotating shaft extends,
the rotary blade cuts the batch of noodle strings at a cutting point, which is a point where the blade edge of the rotary blade is closest to or comes into contact with an outer circumferential surface of an oppositely disposed roller,
in the step of cutting the batch of noodle strings, a blade edge peripheral speed of the rotary blade is changed during rotation thereof between a cut and a next cut,
in the step of cutting the batch of noodle strings, the batch of the noodle strings is cut at a position where a lengthwise direction of the batch of noodle strings extends in a vertical manner,
the rotary blades comprises a plurality of rotary blades attached to the rotating shaft,
in the step of cutting the batch of noodle strings, the blade edge peripheral speed of the plurality of rotary blades is changed periodically with a constant time interval over a plurality of cycles, wherein each of the plurality of cycles is a time period from one cutting timing by one of the plurality of rotary blades to a next cutting timing by another of the plurality of rotary blades cutting the batch of the noodle strings subsequent to the one of the plurality of rotary blades, and
the blade edge peripheral speed is controlled so as to have a constant minimum speed higher than zero, and the batch of the noodle strings is cut at the constant minimum speed.

4. The noodle string treatment method according to claim 1, further comprising steps of, prior to cutting the batch of the noodle strings:
conveying the batch of noodle strings while stretching the batch of noodle strings; and
showering the batch of noodle strings with water or oil.

5. The noodle string treatment method according to claim 1, wherein the blade edge peripheral speed of the rotary blade is changed between a maximum speed and a minimum speed higher than zero within the one cycle and periodically changed over the cycles with the constant time interval.

6. The noodle string treatment method according to claim 3, wherein the blade edge peripheral speed of the rotary blade is changed between a maximum speed and the constant minimum speed within the one cycle and periodically changed over the cycles with the constant time interval.

* * * * *